United States Patent
Lim et al.

(10) Patent No.: US 8,872,860 B2
(45) Date of Patent: Oct. 28, 2014

(54) DISPLAY DEVICE AND DRIVING METHOD THEREOF

(75) Inventors: Jae-Ik Lim, Yongin (KR); Jae-Hyun Kim, Yongin (KR); Won-Sang Park, Yongin (KR); Jong-In Baek, Yongin (KR); Gee-Bum Kim, Yongin (KR); Yong-Seok Yeo, Yongin (KR)

(73) Assignee: Samsung Display Co., Ltd., Yongin, Gyeonggi-Do (KR)

(*) Notice: Subject to any disclaimer, the term of this patent is extended or adjusted under 35 U.S.C. 154(b) by 881 days.

(21) Appl. No.: 13/064,359

(22) Filed: Mar. 21, 2011

(65) Prior Publication Data

US 2012/0113156 A1 May 10, 2012

(30) Foreign Application Priority Data

Nov. 8, 2010 (KR) .................. 10-2010-0110575

(51) Int. Cl.
   G09G 5/10 (2006.01)
   G09G 3/36 (2006.01)
   G02F 1/137 (2006.01)

(52) U.S. Cl.
   CPC ...... *G09G 3/3629* (2013.01); *G09G 2300/0491* (2013.01); *G09G 2310/061* (2013.01); *G09G 2300/0486* (2013.01); *G02F 1/13718* (2013.01)
   USPC ............. 345/690; 345/87; 345/89; 349/86; 349/89

(58) Field of Classification Search
   CPC . G02F 1/1334; G02F 1/13718; G02F 1/1391; G02F 1/133377; G09G 2300/0486; G09G 2300/0495; G09G 2300/0482; C09K 19/544
   USPC ................. 345/87, 89, 690; 349/86, 89, 185
   See application file for complete search history.

(56) References Cited

U.S. PATENT DOCUMENTS

| | | | | |
|---|---|---|---|---|
| 5,208,687 A * | 5/1993 | Yoshida et al. | | 349/91 |
| 5,394,256 A * | 2/1995 | Yamada et al. | | 349/89 |
| 5,835,075 A * | 11/1998 | Nomura et al. | | 345/97 |
| 6,052,103 A * | 4/2000 | Fujiwara et al. | | 345/89 |
| 6,278,429 B1 * | 8/2001 | Ruth et al. | | 345/94 |
| 6,433,843 B1 * | 8/2002 | Okada et al. | | 349/78 |
| 6,819,310 B2 | 11/2004 | Huang et al. | | |
| 2002/0015015 A1 * | 2/2002 | Leung et al. | | 345/87 |
| 2003/0103026 A1 * | 6/2003 | Yamakawa et al. | | 345/87 |
| 2007/0026163 A1 | 2/2007 | Schneider et al. | | |
| 2008/0042959 A1 * | 2/2008 | Ben-Shalom et al. | | 345/94 |
| 2008/0067471 A1 * | 3/2008 | Hiji et al. | | 252/299.7 |
| 2009/0161034 A1 * | 6/2009 | Coates et al. | | 349/35 |
| 2009/0189847 A1 | 7/2009 | Hughes et al. | | |

FOREIGN PATENT DOCUMENTS

JP   2008-268566 A   11/2008

OTHER PUBLICATIONS

Hsiao; A PWM Data Driver with Different RGB Driving Voltages for Bistable Displays; ASID; pp. 477-479; Oct. 8-12, 2006; New Delhi, India.

* cited by examiner

*Primary Examiner* — Koosha Sharifi-Tafreshi
(74) *Attorney, Agent, or Firm* — Lee & Morse, P.C.

(57) ABSTRACT

A method for driving a display device includes cumulatively applying a reset pulse of a predetermined level to a first electrode and applying a common voltage to a second electrode opposed to the first electrode to form an initial state of a plurality of cholesteric liquid crystal capsules included in a liquid crystal layer between the first electrode and the second electrode. The method also includes cumulatively applying a data pulse of a predetermined level to the first electrode to display a grayscale.

29 Claims, 11 Drawing Sheets

DISPLAY DEVICE AND DRIVING METHOD THEREOF

BACKGROUND

1. Field

Embodiments relate to a display device and a driving method thereof. More particularly, embodiments relate to a display device using a capsulated cholesteric liquid crystal, and a driving method thereof.

2. Description of the Related Art

A next generation display has progressed to one that is capable of realizing a motion picture and having a light weight, a thin thickness, high efficiency, and a natural color. Furthermore, the display has progressed to a flexible display that is thin and flexible. The flexible display may be applied to all display modes that are based on an active driving element such as a liquid crystal display (LCD), a field emission display (FED), a plasma display panel (PDP), and an organic light emitting diode (OLED) display.

The above information disclosed in this Background section is only for enhancement of understanding of the background of the invention and therefore it may contain information that does not form the prior art that is already known in this country to a person of ordinary skill in the art.

SUMMARY

Embodiments are directed to a display device that includes cholesteric liquid crystal capsules having strong resistance against external pressure.

Embodiments may be realized by providing a driving method of a display device that includes cumulatively applying a reset pulse of a predetermined level to a first electrode and applying a common voltage to a second electrode opposed to the first electrode to form a plurality of cholesteric liquid crystal capsules included in a liquid crystal layer between the first electrode and the second electrode as an initial state, and cumulatively applying a data pulse of a predetermined level to the first electrode to display a grayscale.

The reset pulse may include a positive voltage reset pulse and a negative voltage reset pulse.

The reset pulse may be a short-period AC pulse in which the positive voltage reset pulse and the negative voltage reset pulse are alternately applied. The reset pulse may be a delay AC pulse including a delay time in which 0V is applied between the positive voltage reset pulse and the negative voltage reset pulse. The reset pulse may be applied during the reset period, and a final pulse of the reset period may be the positive voltage reset pulse. The reset pulse may be applied during the reset period, and the final pulse of the reset period may be the negative voltage reset pulse. The reset pulse may be a long-period AC pulse including a plurality of sequent positive voltage reset pulses and a plurality of sequent negative voltage reset pulses.

The data pulse may include a positive voltage data pulse and a negative voltage data pulse.

The data pulse may be a short-period AC pulse in which the positive voltage data pulse and the negative voltage data pulse are alternately applied. The data pulse may be a delay AC pulse including a delay time in which 0V is applied between the positive voltage data pulse and the negative voltage data pulse. The data pulse may be a long-period AC pulse including a plurality of sequent positive voltage data pulses and a plurality of sequent negative voltage data pulses.

The initial state may be a planar state in which a spiral axis of the cholesteric liquid crystal molecule included in the cholesteric liquid crystal capsule is oriented toward the direction perpendicular to the first electrode and the second electrode.

The initial state may be a homeotropic state in which a cholesteric liquid crystal molecule included in the cholesteric liquid crystal capsule is oriented toward the direction of the electric field.

The initial state may be a focal conic state in which the spiral axis of the cholesteric liquid crystal molecule included in the cholesteric liquid crystal capsule is oriented toward the direction parallel to the first electrode and the second electrode.

Embodiments may also be realized by providing a display device that includes a first substrate; a first electrode disposed on the first substrate; a second substrate opposed to the first substrate; a second electrode disposed under the second substrate and opposed to the first electrode; a liquid crystal layer positioned between the first electrode and the second electrode and including a plurality of cholesteric liquid crystal capsules, and a controller applying a reset pulse of a first level and a data pulse of a second level to the first electrode and applying a common voltage to the second electrode.

The first electrode may be made of a material that absorbs incident light.

The first electrode may be made of one of carbon black, a compound of carbon black and polyvinylidene fluoride, a compound of carbon nanotubes and polyvinylidene fluoride, a composite of a black dye and nano-silver, and a graphite composite.

The second electrode may be made of one of indium tin oxide and indium zinc oxide.

The plurality of cholesteric liquid crystal capsules may include a cholesteric liquid crystal material in which a chiral agent providing a twisting force to liquid crystal molecules is added to a nematic liquid crystal material having positive dielectric constant anisotropy and a polymer encapsulating the cholesteric liquid crystal material.

The controller may cumulatively apply the reset pulse of a first level during a predetermined reset period to form the cholesteric liquid crystal capsules as one initial state of a planar state, a homeotropic state, and a focal conic state.

The reset pulse of the first level may include a positive voltage reset pulse and a negative voltage reset pulse.

The controller may alternately apply the positive voltage reset pulse and the negative voltage reset pulse. The controller may apply the positive voltage reset pulse and the negative voltage reset pulse with a delay time in which 0V is applied between the positive voltage reset pulse and the negative voltage reset pulse. The controller may apply a plurality of sequent positive voltage reset pulses and a plurality of sequent negative voltage reset pulses.

The controller may cumulatively apply the data pulse of the second level during a predetermined data period to change a cholesteric phase of the cholesteric liquid crystal material included in the cholesteric liquid crystal capsules of the initial state for displaying a grayscale.

The data pulse of the second level may include a positive voltage data pulse and a negative voltage data pulse.

The controller may alternately apply the positive voltage data pulse and the negative voltage data pulse. The controller may apply the positive voltage data pulse and the negative voltage data pulse with a delay time in which 0V is applied between the positive voltage data pulse and the negative voltage data pulse. The controller may apply a plurality of sequent positive voltage data pulses and a plurality of sequent negative voltage data pulses.

A cholesteric liquid crystal display having strong resistance against external pressure may be provided by encapsulating the cholesteric liquid crystal. To display the grayscale in the cholesteric liquid crystal display, one voltage level is used without a plurality of voltage levels such that the driving IC may be simplified, and may be down-sized.

DETAILED DESCRIPTION

Figure 1:
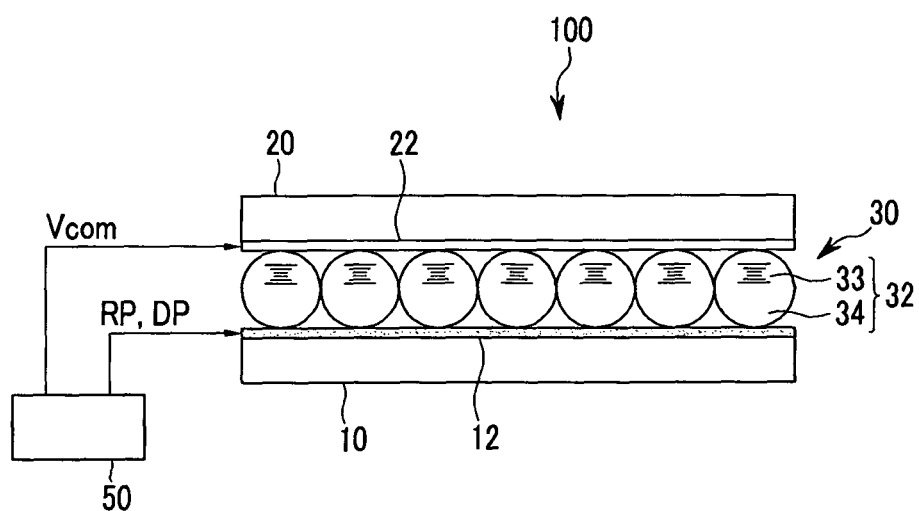
FIG. 1 illustrates a block diagram of a display device, according to an exemplary embodiment.

This application claims priority to and the benefit of Korean Patent Application No. 10-2010-0110575, filed on Nov. 8, 2010, in the Korean Intellectual Property Office, and entitled: "Display Device and Driving Method Thereof," the entire contents of which are incorporated herein by reference.

Hereinafter, some exemplary embodiments are described in detail with reference to the accompanying drawings in order for those skilled in the art to be able to readily practice the exemplary embodiments. As those skilled in the art would realize, the described embodiments may be modified in various different ways, all without departing from the spirit or scope of the present invention.

Furthermore, in some exemplary embodiments, constituent elements having the same construction are assigned the same reference numerals and are described in connection with a first exemplary embodiment as a representative example. In the remaining exemplary embodiments, only constituent elements different from those of the first exemplary embodiment are described.

In order to clarify a description of the present invention, parts not related to the description are omitted, and the same reference numbers are used throughout the drawings to refer to the same or like parts.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a block diagram of a display device according to an exemplary embodiment.

Referring to FIG. 1, the display device 100 may include a first substrate 10, a first electrode 12 disposed on the first substrate 10, a second substrate 20 opposed to the first substrate 10, a second electrode 22 disposed under the second substrate 20 (the surface opposed to the first substrate 10) and opposed to the first electrode 12, a liquid crystal layer 30 interposed between the first electrode 12 and the second electrode 22, and a controller 50. The controller 50 may apply a reset pulse RP of a first level and a data pulse DP of a second level to the first electrode 12. The controller 50 may apply a common voltage Vcom to the second electrode 22. The liquid crystal layer 30 may include a plurality of cholesteric liquid crystal capsules 32.

The first substrate 10 and the second substrate 20 may be made of, e.g., glass and/or plastic. The first substrate 10 and the second substrate 20 made of glass or plastic may provide flexibility and transparency to a display unit.

The first electrode 12 may be made of, e.g., carbon black, a compound of carbon black and polyvinylidene fluoride, a compound of carbon nanotubes (CNT) and polyvinylidene fluoride, a composite of black dye and nano-silver (nano-Ag), or a graphite composite. The first electrode 12 may have a function of a black layer for absorbing incident light.

The second electrode 22 may be made of, e.g., a transparent conductive layer such as indium tin oxide (ITO) and/or indium zinc oxide (IZO).

The liquid crystal layer 30 may be coated with a plurality of cholesteric liquid crystal capsules 32 as one layer. The cholesteric liquid crystal capsules 32 may include a cholesteric liquid crystal material 33 and a polymer 34 encapsulating the cholesteric liquid crystal material 33. The cholesteric liquid crystal capsules 32 may be formed by, e.g., a ceramic membrane method, a micro-channel method, or a stirring method.

The cholesteric liquid crystal material 33 may be a liquid crystal mixture in which, e.g., a chiral agent twisting the liquid crystal molecule is added to a nematic liquid crystal material having positive dielectric constant anisotropy. If the chiral agent is added to the nematic liquid crystal, a cholesteric phase in which the nematic liquid crystal molecules are strongly twisted with a spiral shape may be formed. The cholesteric liquid crystal material 33 may be formed with one state among a planar state, a focal conic state, and an intermediate state in which the planar state and the focal conic state are mixed by, e.g., an electric field formed between the first electrode 12 and the second electrode 22. The cholesteric liquid crystal material 33 forming the planar state, the focal conic state, or the intermediate state may stably maintain that state when no electric field is applied.

The cholesteric liquid crystal material 33 of the planar state may be configured to selectively reflect light of a predetermined wavelength range. The cholesteric liquid crystal material 33 of the focal conic state may be configured to transmit light of almost all wavelengths. The selection wavelength realizing selective reflection of the cholesteric liquid crystal material 33 of the planar state may be represented as $\lambda = n*P$. Here, $\lambda$ is the selection wavelength, n is an average refractive index of the cholesteric liquid crystal, and P is a spiral pitch of the cholesteric liquid crystal. The average refractive index and the spiral pitch of the cholesteric liquid crystal may be controlled to determine the selection wavelength reflected by the cholesteric liquid crystal material 33.

A plurality of cholesteric liquid crystal capsules 32 included in the liquid crystal layer 30 may include, e.g., red cholesteric liquid crystal capsules selectively reflecting red light, green cholesteric liquid crystal capsules selectively reflecting green light, and blue cholesteric liquid crystal capsules selectively reflecting blue light. For example, the average refractive index and the spiral pitch of the cholesteric liquid crystal may be controlled to form the cholesteric liquid crystal material 33 having a selection wavelength of, e.g., about 660 nm, and it is encapsulated to form red cholesteric liquid crystal capsules. The cholesteric liquid crystal material 33 included in the green cholesteric liquid crystal capsules may have a selection wavelength of, e.g., about 540 nm. The cholesteric liquid crystal material 33 included in the blue cholesteric liquid crystal capsules may have a selection wavelength of, e.g., about 450 nm.

One pixel may include a plurality of cholesteric liquid crystal capsules that may not have a selection wavelength of a predetermined range. Here, the pixel may display a grayscale of a black color by the common voltage Vcom and the data pulse DP.

Also, one pixel may include a plurality of cholesteric liquid crystal capsules that have a selection wavelength of a predetermined range. Here, the pixel displays a color of the selection wavelength by the common voltage Vcom and the data pulse DP. For example, the first pixel includes the red cholesteric liquid crystal capsules to display the red R color, the second pixel includes the green cholesteric liquid crystal capsules to display the green G color, and the third pixel includes the blue cholesteric liquid crystal capsules to display the blue B color. The first pixel, the second pixel, and the third pixel may form one dot, and the red R, the green G, and the blue B colors that are displayed in the first pixel, the second pixel, and the third pixel may display RGB images.

The controller 50 may apply the reset pulse RP or the data pulse DP to the first electrode 10. The reset pulse RP is a pulse to initialize a plurality of pixels. The reset pulse RP may be, e.g., an AC pulse having a positive voltage or a negative voltage of a predetermined level. The data pulse DP is a pulse displaying the grayscale in the pixel. The data pulse DP may be, e.g., an AC pulse having a positive voltage or a negative voltage of a predetermined level.

The controller 50 may cumulatively apply the reset pulse RP of a first level during a predetermined reset period to form the cholesteric liquid crystal capsule 32 into one initial state among the planar state, the homeotropic state, and the focal conic state. Also, the controller 50 may cumulatively apply the data pulse DP of a second level during a predetermined data period to change the cholesteric phase of the cholesteric liquid crystal material 33 included in the cholesteric liquid crystal capsule 32 of the initial state. Thereby, the controller 50 may control the displaying of the grayscale by the cholesteric liquid crystal capsule 32 through, e.g., the data pulse DP.

As described above, the display device 100 including the liquid crystal layer 30 made of a plurality of cholesteric liquid crystal capsules 32 may be strong against transformation by external pressure. Also, the first electrode 12 may function as the black layer, such that it is may not be necessary to provide an additional black. Accordingly, the manufacturing process and the structure of the display device 100 may be simplified.

The display device 100 may be driven according to a driving method that includes using the reset period to initialize the plurality of cholesteric liquid crystal capsules 32 and the data period to display the data through the plurality of cholesteric liquid crystal capsules 32.

Firstly, a method for initializing the plurality of cholesteric liquid crystal capsules will be described with reference to FIG. 2 to FIG. 8.

Figure 2:
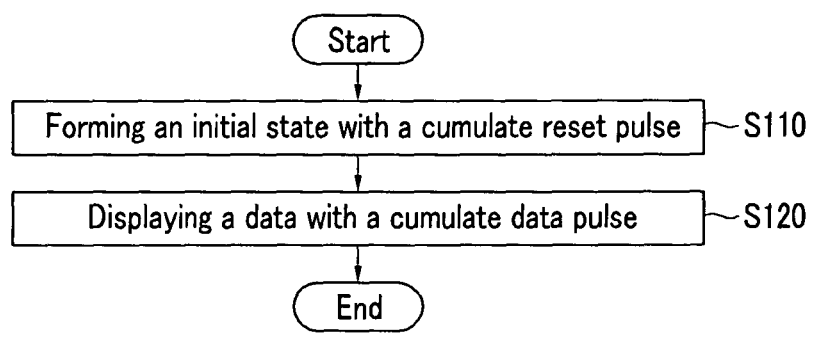
FIG. 2 illustrates a flowchart of a driving method of a display device, according to an exemplary embodiment.
Figure 3:
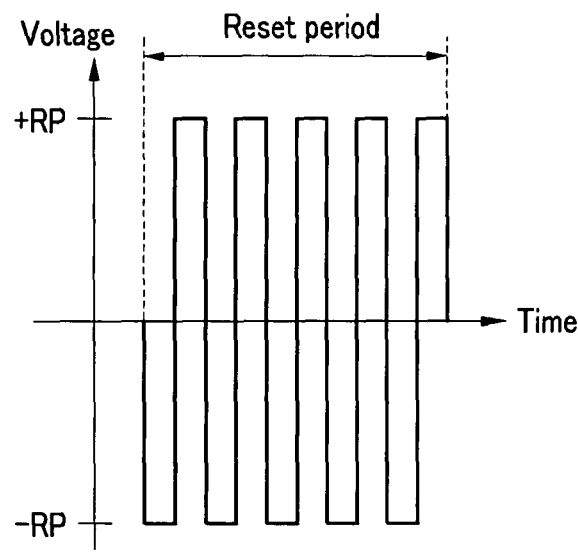
FIG. 3 illustrates a timing diagram showing a type of a reset pulse, according to an exemplary embodiment.
Figure 4:
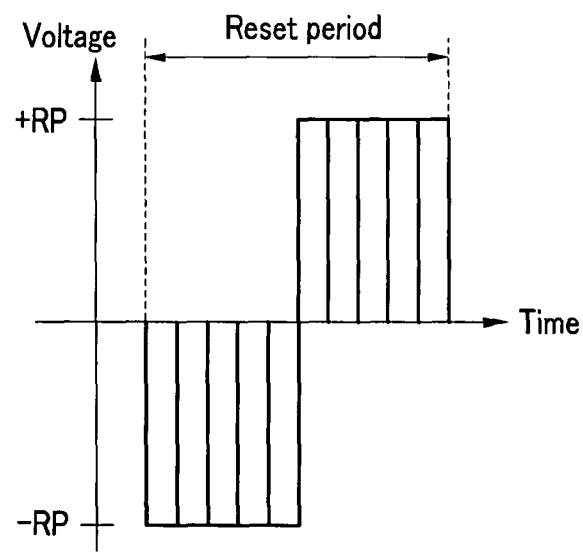
FIG. 4 illustrates a timing diagram showing a type of a reset pulse, according to an exemplary embodiment.
Figure 5:
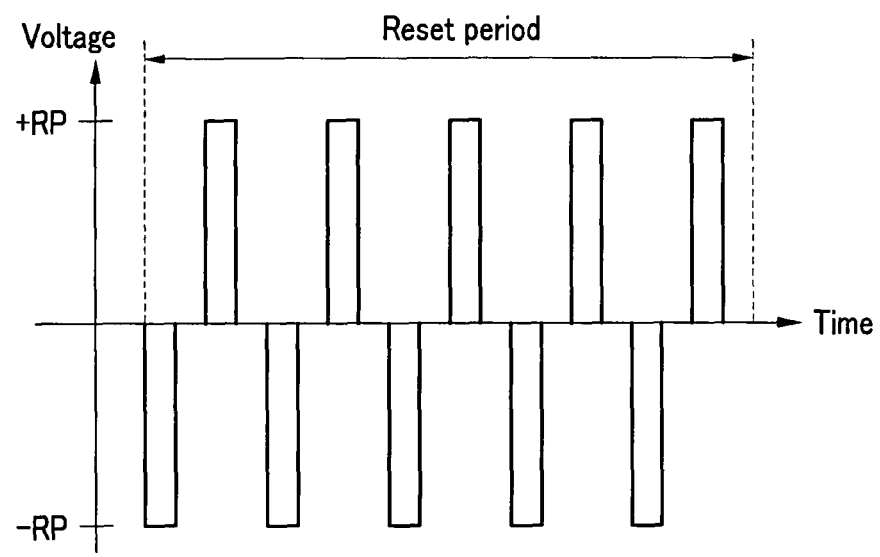
FIG. 5 illustrates a timing diagram showing a type of a reset pulse according to an exemplary embodiment.
Figure 6:
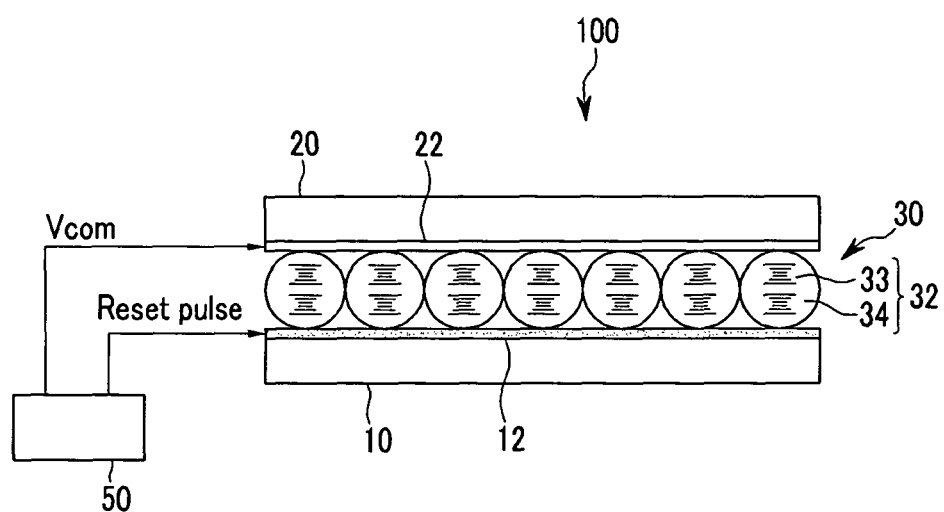
FIG. 6 illustrates a view of a reset state of a display device, according to an exemplary embodiment.
Figure 7:
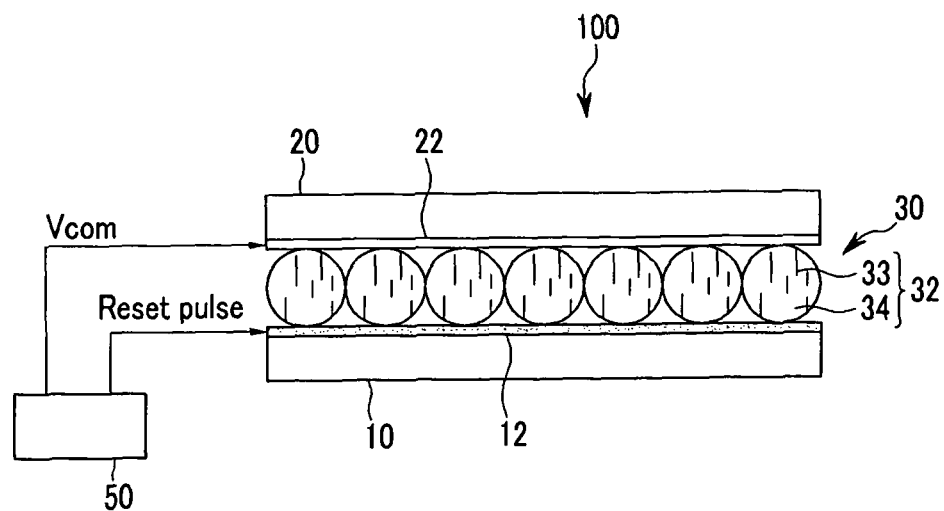
FIG. 7 illustrates a view of a reset state of a display device, according to an exemplary embodiment.
Figure 8:
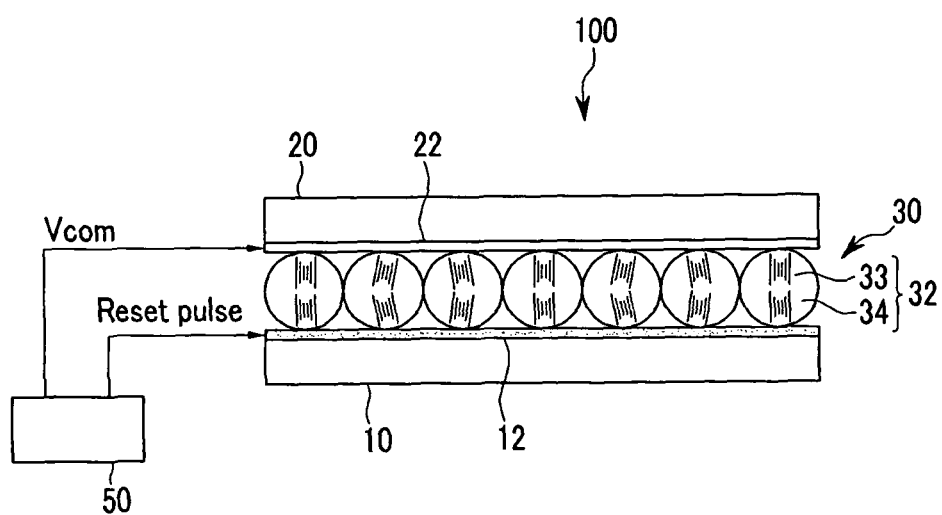
FIG. 8 illustrates a view of a reset state of a display device, according to an exemplary embodiment.

FIG. 2 is a flowchart of a driving method of a display device according to an exemplary embodiment. FIG. 3 is a timing diagram showing a type of a reset pulse according to an exemplary embodiment. FIG. 4 is a timing diagram showing a type of a reset pulse according to another exemplary embodiment. FIG. 5 is a timing diagram showing a type of a reset pulse according to another exemplary embodiment. FIG. 6 is a view showing a reset state of a display device according to an exemplary embodiment. FIG. 7 is a view showing a reset state of a display device according to another exemplary embodiment. FIG. 8 is a view showing a reset state of a display device according to another exemplary embodiment.

Referring to FIG. 2, during the reset period, the controller 50 may cumulatively apply the reset pulse RP of the predetermined level to the first electrode 12 to form an initial state (S110). Here, the second electrode 22 may be applied with the common voltage Vcom. The common voltage Vcom may be, e.g., a voltage of about 0 V.

The frequency and the pulse width of the reset pulse RP may be variously determined. For example, the reset pulse RP may have a frequency of about 120 Hz and a pulse width of about 8.33 ms, a frequency of about 100 Hz and a pulse width of about 10 ms, or a frequency of about 60 Hz and a pulse width of about 16.6 ms.

The type of the reset pulse includes, e.g., (1) a short-period AC pulse including the positive voltage reset pulse and the negative voltage reset pulse of a predetermined level, (2) a long-period AC pulse including a plurality of continuous short-period positive voltage reset pulses and a plurality of continuous short-period negative voltage reset pulses, and (3) a delay AC pulse including a delay time in which 0V is applied between the positive voltage reset pulse and the negative voltage reset pulse, or between the negative voltage reset pulse and the positive voltage reset pulse. In each type of reset pulse, the final pulse of the reset period may be the positive voltage reset pulse or the negative voltage reset pulse.

Referring to FIG. 3, the type of reset pulse is the case of the short-period AC pulse. The positive voltage reset pulse +RP and the negative voltage reset pulse −RP of the predetermined level may be alternately applied during the reset period. For example, when the reset period is 100 ms, the short-period positive voltage reset pulse +RP and the negative voltage reset pulse −RP having the pulse width of 10 ms may be alternately applied multiple times, e.g., ten times.

Referring to FIG. 4, the type of reset pulse RP is the case of the long-period AC pulse. A plurality of sequent short-period negative voltage reset pulses and a plurality of sequent short-period positive voltage reset pulses of the predetermined level may be applied during the reset period. The long-period negative voltage reset pulse −RP may include a plurality of short-period negative voltage reset pulses. The long-period positive voltage reset pulse +RP may includes a plurality of short-period positive voltage reset pulses. For example, when the pulse width of the short-period AC pulse is 10 ms and the pulse width of the long-period AC pulse is 50 ms, one long-period AC pulse includes five sequent short-period AC pulses.

Referring to FIG. 5, the type of reset pulse is the case of the delay AC pulse. The negative voltage reset pulse −RP may be applied after the predetermined delay time after the positive voltage reset pulse +RP is applied, and the positive voltage reset pulse +RP may be applied after the predetermined delay time after the negative voltage reset pulse +RP is applied. The voltage 0 V that is, e.g., the same as the common voltage Vcom, may be applied during the delay time.

If the AC pulse in which the positive voltage reset pulse +RP and the negative voltage reset pulse −RP are alternately applied, e.g., as discussed above, is used as the reset pulse, deterioration of the cholesteric liquid crystal material 33 may be suppressed.

The first electrode 12 may be cumulatively applied with the positive voltage reset pulse +RP and the negative voltage reset pulse −RP such that the predetermined electric field is formed to the liquid crystal layer 30, and thereby the cholesteric liquid crystal capsule 32 is formed with the initial state.

The initial state of a plurality of cholesteric liquid crystal capsules 32 may be formed with (1) the planar state, (2) the homeotropic state, or (3) the focal conic state according to the application of the reset pulse. For example, the reset pulse may be applied with one type of the short-period AC pulse, the long-period AC pulse, and the delay AC pulse.

Planar State Formation

Referring to FIG. 6, the second electrode 22 may be applied with the common voltage Vcom of, e.g., about 0 V, and the first electrode 12 may be applied with the reset pulse RP of the predetermined high voltage (e.g., ±60 V) to generate a relatively strong electric field to the liquid crystal layer 30. The spiral structure may be loosened, e.g., completed loosened, in the cholesteric liquid crystal material 33 included in the cholesteric liquid crystal capsule 32. Accordingly, the cholesteric liquid crystal molecules may be oriented toward the direction of the electric field, thereby forming the homeotropic state. If the first electrode 12 is applied with the predetermined low voltage (e.g., 0 V) to decrease, e.g., quickly decrease, the electric field to the liquid crystal layer 30, the spiral axis of the cholesteric liquid crystal molecules may be oriented toward the direction approximately perpendicular to the two electrodes 12 and 22, thereby forming the planar state.

Homeotropic State Formation

Referring to FIG. 7, the second electrode 22 may be applied with the common voltage Vcom of, e.g., about 0 V, and the reset pulse RP of the predetermined high voltage (e.g., ±60 V) may be applied to the first electrode 12 to generate the relatively strong electric field to the liquid crystal layer 30. The spiral structure may be loosened, e.g., completely loosened, in the cholesteric liquid crystal material 33 included in the cholesteric liquid crystal capsule 32. Accordingly, the cholesteric liquid crystal molecules may be oriented toward the direction of the electric field, thereby forming the homeotropic state. The initial state of the plurality of cholesteric liquid crystal capsules 32 may be maintained as the homeotropic state during the time that the liquid crystal layer 30 is formed with the electric field by the common voltage Vcom and the predetermined high voltage.

Focal Conic State Formation

Referring to FIG. 8, the second electrode 22 may be applied with the common voltage Vcom of about 0 V and the first electrode 12 may be applied with the reset pulse RP of the predetermined voltage (e.g., ±20 V to ±30 V) to generate the relatively weak electric field to the liquid crystal layer 30. The cholesteric liquid crystal material 33 included in the cholesteric liquid crystal capsule 32 may be formed with the state that the spiral structure is not completely loosened. If the first electrode 12 is applied with the predetermined low voltage (e.g., 0V) to decrease, e.g., quickly decrease, the electric field to the liquid crystal layer 30, the spiral axis of the cholesteric liquid crystal molecule may be oriented toward the direction approximately parallel to two electrodes 12 and 22, thereby forming the focal conic state.

After the second electrode 22 is applied with the common voltage Vcom of about 0 V and the first electrode 12 is applied with the reset pulse RP of the predetermined high voltage (e.g., ±60V) to generate the relatively strong electric field to the liquid crystal layer 30, if the predetermined high voltage applied to the first electrode 12 is slowly decreased, the cholesteric liquid crystal material 33 may form the focal conic state.

Next, a method for displaying data to a plurality of cholesteric liquid crystal capsules (a display device) will be described with reference to FIG. 2 and FIGS. 9 to 15.

Figure 9:
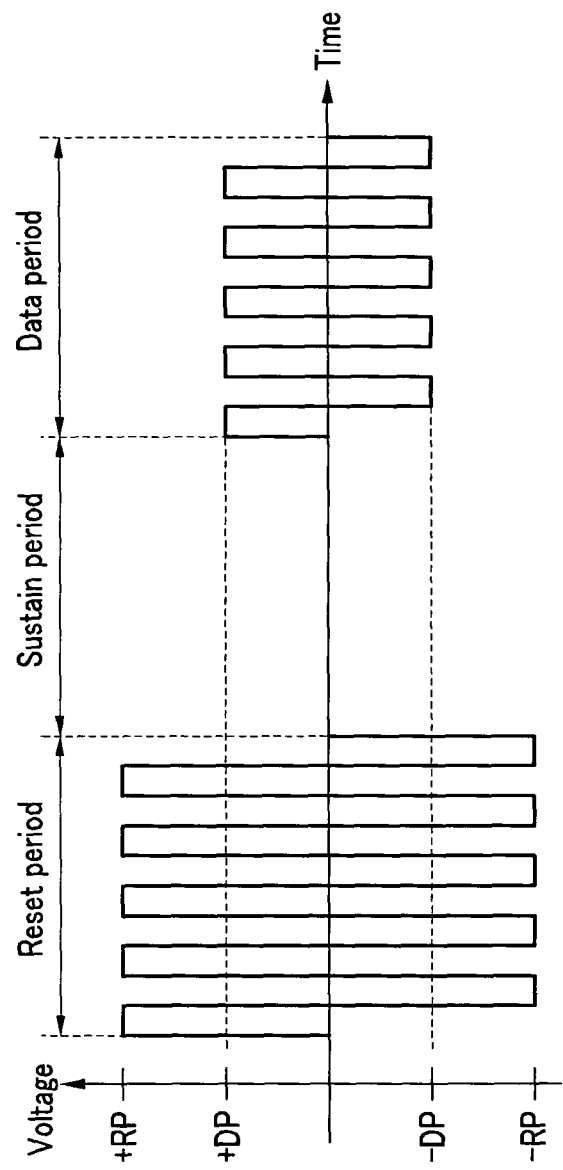
FIG. 9 illustrates a timing diagram showing a reset pulse and a data pulse, according to an exemplary embodiment.
Figure 10:
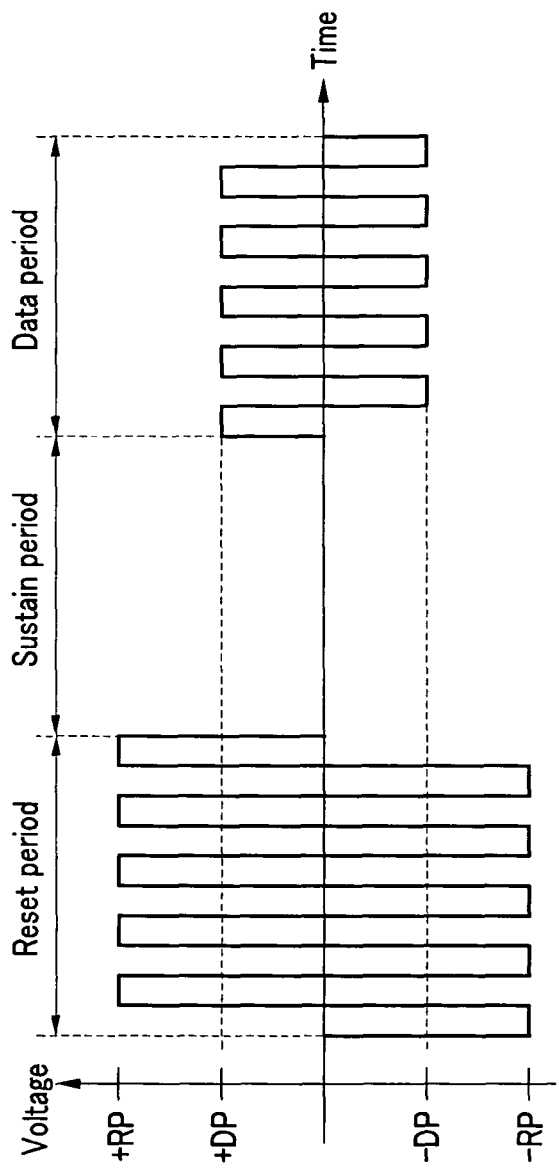
FIG. 10 illustrates a timing diagram showing a reset pulse and a data pulse, according to an exemplary embodiment.
Figure 11:
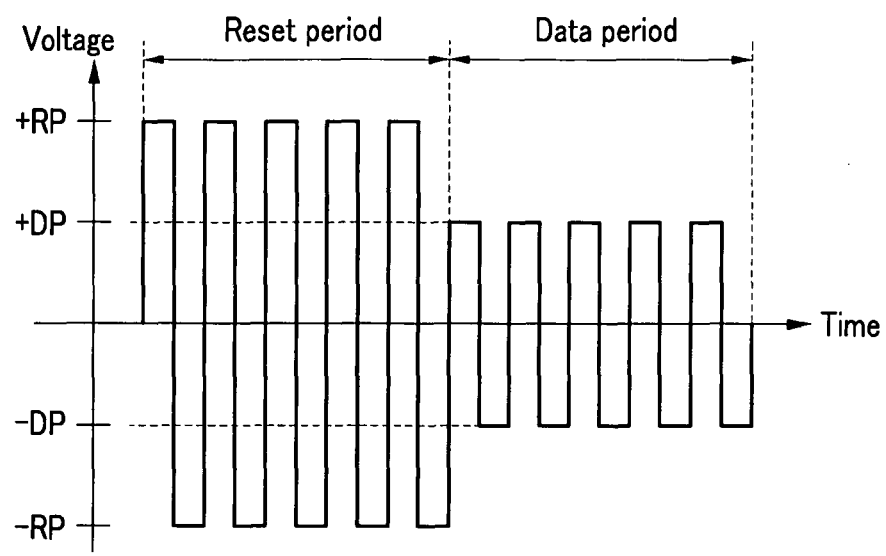
FIG. 11 illustrates a timing diagram showing a reset pulse and a data pulse, according to another exemplary embodiment.
Figure 12:
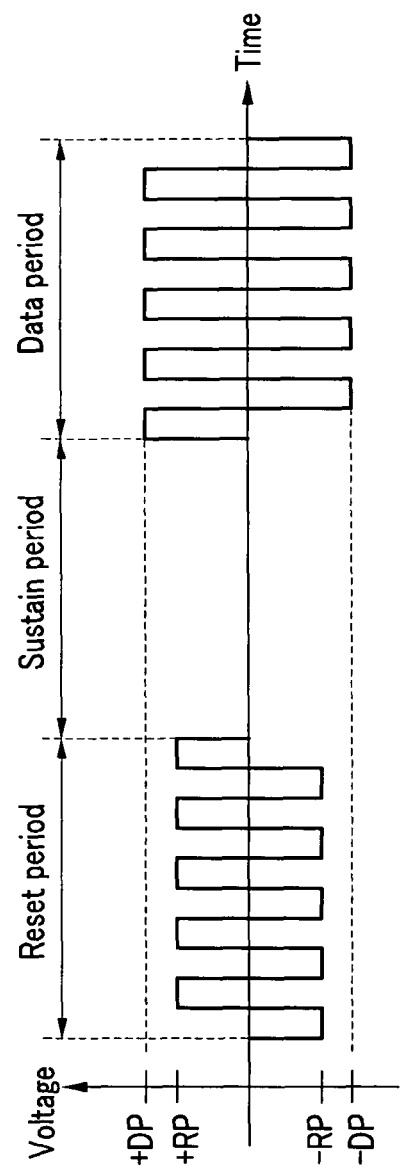
FIG. 12 illustrates a timing diagram showing a reset pulse and a data pulse, according to an exemplary embodiment.
Figure 13:
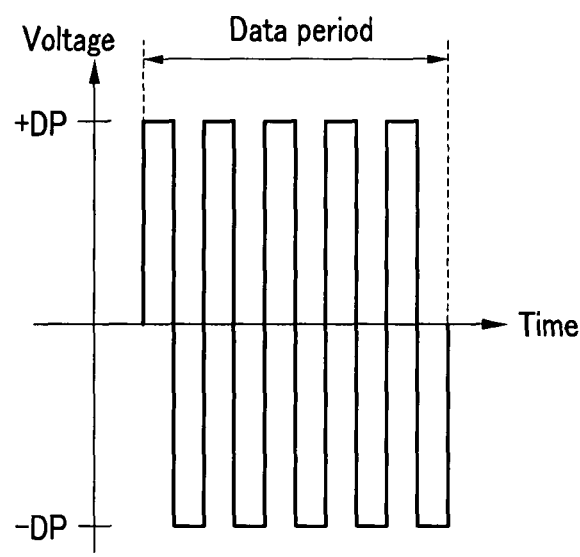
FIG. 13 illustrates a timing diagram showing a data pulse, according to an exemplary embodiment.
Figure 14:
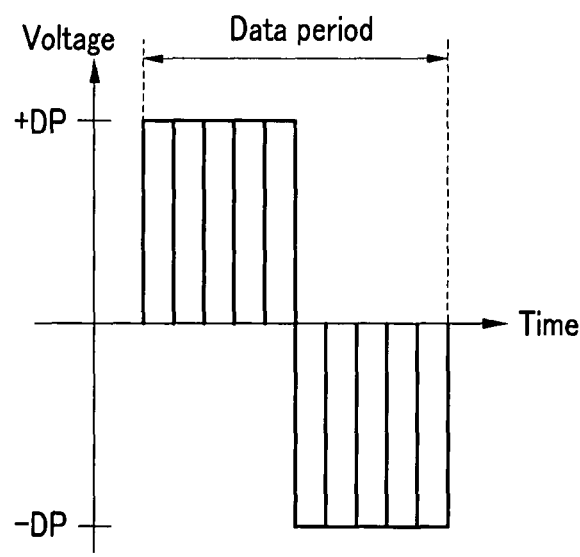
FIG. 14 illustrates a timing diagram showing a data pulse, according to an exemplary embodiment.
Figure 15:
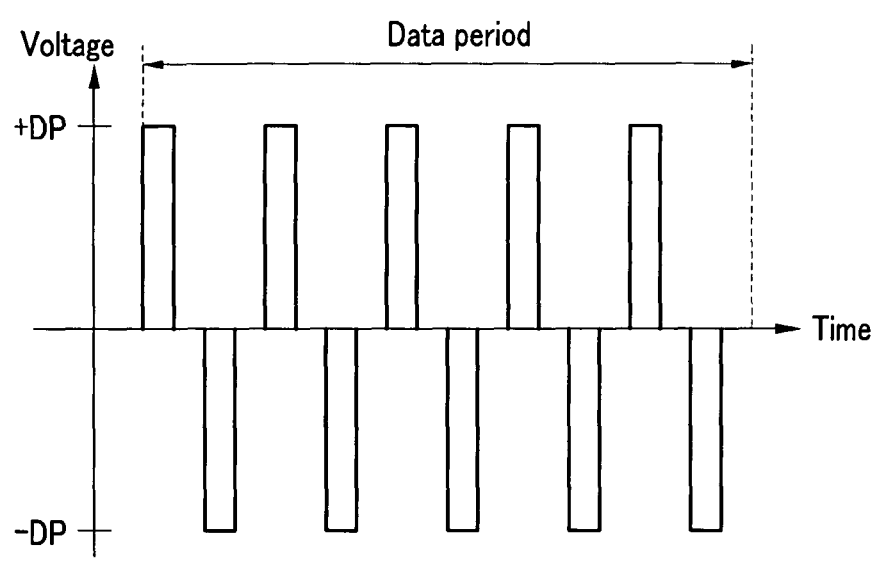
FIG. 15 illustrates a timing diagram showing a data pulse, according to another exemplary embodiment.

FIG. 9 is a timing diagram showing a reset pulse RP and a data pulse DP according to an exemplary embodiment. FIG. 10 is a timing diagram showing a reset pulse RP and a data pulse DP according to another exemplary embodiment. FIG. 11 is a timing diagram showing a reset pulse RP and a data pulse DP according to another exemplary embodiment. FIG. 12 is a timing diagram showing a reset pulse DP and a data pulse DP according to another exemplary embodiment. FIG. 13 is a timing diagram showing a data pulse DP according to an exemplary embodiment. FIG. 14 is a timing diagram showing a data pulse DP according to another exemplary embodiment. FIG. 15 is a timing diagram showing a data pulse DP according to another exemplary embodiment.

Again referring to FIG. 2, after forming a plurality of cholesteric liquid crystal capsules 32 of the initial state through the reset pulse DP (S110), the controller 50 may cumulatively apply the data pulse DP of the predetermined level to the first electrode 12 during a data period to display the data (or the grayscale) (S120). Here, the second electrode 22 may be applied with the common voltage Vcom.

The frequency and the pulse width of the data pulse may be variously determined. For example, the reset pulse RP may have a frequency of 120 Hz and a pulse width of 8.33 ms, a frequency of 100 Hz and a pulse width of 10 ms, or a frequency of 60 Hz and a pulse width of 16.6 ms.

A plurality of grayscales may be displayed according to the number of data pulses of the predetermined level that are cumulatively applied to the cholesteric liquid crystal capsule 32 of the initial state during the data period. For example, in the case that the initial state may be the planar state, the cholesteric liquid crystal capsule 32 of the initial state may represent the grayscale of the maximum level, and the grayscale of the cholesteric liquid crystal capsule 32 may be decreased by 1 grayscale every time the data pulse DP is applied. In the case that the initial state is the focal conic state, the cholesteric liquid crystal capsule 32 of the initial state may represent the grayscale of the minimum level, and the grayscale of the cholesteric liquid crystal capsule 32 may be increased by 1 grayscale every time the data pulse DP is applied. That is, when the number of data pulses of the predetermined level that are cumulatively applied during the data period is N, the number of grayscales capable of being displayed in the display device is N+1. For example, when the data period is 100 ms and a data pulse having a frequency of 100 Hz and a pulse width of 10 ms is applied, the data pulse may be applied ten times during the data period and the cholesteric liquid crystal capsule 32 may display 11 grayscales.

As methods for displaying the data (the grayscale) by using three initial states (the planar state, the homeotropic state, and the focal conic state) of the cholesteric liquid crystal capsule 32, there are three methods for changing the state of the cholesteric liquid crystal material 33, such as (1) the planar state→the focal conic state, (2) the homeotropic state→the focal conic state, and (3) the focal conic state→the planar state.

(1) Planar State→the Focal Conic State

Referring to FIG. 9, a sustain period to form the cholesteric liquid crystal material 33 into the stable initial state is included between the reset period in which the reset pulse is applied and the data period in which the data pulse is applied.

The short-period AC pulse is applied as the reset pulse during the reset period. However embodiments are not limited thereto, e.g., the long-period AC pulse or the delay AC pulse may be applied as the reset pulse.

The second electrode 22 may be applied with the common voltage Vcom of about 0 V, and the first electrode 12 may be alternately applied with the positive voltage reset pulse +RP and the negative voltage reset pulse +RP during the reset period. The reset pulse may be applied with a high voltage of about ±60 V. The cholesteric liquid crystal material 33 may be changed into the homeotropic state between the strong electric field formed between the first electrode 12 and the second electrode 22.

If the first electrode 12 is applied with the low voltage of 0V during the sustain period to quickly decrease the electric field between the first electrode 12 and the second electrode 22, the cholesteric liquid crystal material 33 may be formed as the planar state and may be stable. That is, the cholesteric liquid crystal capsule 32 may form the planar state through the reset period and the sustain period.

During the data period, the second electrode 22 may be applied with the common voltage Vcom of about 0 V, and the first electrode 12 may be cumulatively applied with the data pulse of the predetermined level. The data pulse may be the AC pulse ±DP in which the positive voltage data pulse +DP and the negative voltage data pulse −DP may be alternately applied. The voltage of the data pulse to change the cholesteric liquid crystal capsule 32 of the planar state into the focal conic state may be in a range of about ±20 V to ±30 V. In the exemplary changing of the cholesteric liquid crystal material 33 from the planar state into the focal conic state, the voltage of the data pulse to increase the contrast ratio may be about ±27 V.

The data period may be determined as a time capable of changing the planar state of the cholesteric liquid crystal material 33 into the focal conic state. Whenever the positive voltage data pulse +DP or the negative voltage data pulse −DP is applied, the partial cholesteric liquid crystal material 33 included in the cholesteric liquid crystal capsule 32 may be changed into the state in which the spiral structure is partially loosened, and as the number of applied data pulses may be increased, the cholesteric liquid crystal material 33 that is changed into the state in which the spiral structure is partially loosened may be increased. If a large number of data pulses are applied during the data period, all cholesteric liquid crystal material 33 included in the cholesteric liquid crystal capsule 32 may be changed into the state in which the spiral structure is partially loosened. If the first electrode 12 is applied with the data pulse of the predetermined voltage and then the low voltage of 0V is applied, the cholesteric liquid crystal material 33 in which the spiral structure is partially loosened may be formed with the focal conic state.

That is, the cholesteric liquid crystal material of the planar state and the cholesteric liquid crystal material of the focal conic state may be formed together according to the number of data pulses that are applied to the cholesteric liquid crystal capsule 32, thereby displaying the grayscale according thereto. The initial state of the cholesteric liquid crystal capsule 32 may represent the maximum grayscale, and the grayscale may be decreased by one step whenever one positive voltage data pulse +DP or one negative voltage data pulse −DP is applied. If all data pulses are applied during the data period, the cholesteric liquid crystal capsule 32 may represent the minimum grayscale.

The reset period, the sustain period, and the data period may be controlled with various times. For example, when the data period is determined as 100 ms in which the data pulse having the pulse width of 10 ms is applied ten times, the reset period may be determined as 50 ms of the time that the cholesteric liquid crystal capsule 32 is sufficiently formed with the initial state, and the sustain period may be determined as 50 ms to 100 ms.

Referring to FIG. 10, the polarity of the final pulse of the reset period may be different from that of FIG. 9. In FIG. 9, while the final pulse of the reset period is the negative voltage reset pulse, the final pulse of the reset period may be the positive voltage reset pulse in FIG. 10.

The reflexibility and contrast rate of the cholesteric liquid crystal capsule 32 may be changed according to the polarity of the final pulse of the reset period. The case in which the final pulse of the reset period is the positive voltage reset pulse represents high reflexibility by about 25% compared with the case of the negative voltage reset pulse. Accordingly, if the final pulse of the reset period is formed with the positive voltage reset pulse, the contrast ratio of the cholesteric liquid crystal capsule 32 may be increased by about 25%.

(2) Homeotropic State→the Focal Conic State

Referring to FIG. 11, the short-period AC pulse may be applied as the reset pulse during the reset period. Embodiments are not limited thereto, e.g., the long-period AC pulse or the delay AC pulse may be applied as the reset pulse.

During the reset period, the second electrode 22 may be applied with the common voltage Vcom of about 0 V and the first electrode 12 may be alternately applied with the positive voltage reset pulse +RP and the negative voltage reset pulse +RP. The reset pulse may be applied with a high voltage of about ±60 V. The cholesteric liquid crystal material 33 may be changed into the homeotropic state by the strong electric field formed between the first electrode 12 and the second electrode 22. That is, the cholesteric liquid crystal capsule 32 may form the homeotropic state as the initial state at the reset period. When the initial state of the cholesteric liquid crystal capsule 32 is the homeotropic state, the sustain period to make the cholesteric liquid crystal material 33 have the stable initial state may not be necessary, e.g., may not be needed.

During the data period, the second electrode 22 may be applied with the common voltage Vcom of about 0 V and the first electrode 12 may be cumulatively applied with the data pulse of the predetermined level. The data pulse may be the AC pulse ±DP in which the positive voltage data pulse +DP and the negative voltage data pulse −DP may be alternately applied.

The voltage of the data pulse to change the homeotropic state of the cholesteric liquid crystal capsule 32 into the focal conic state may be in the range of about ±20 V to about ±30 V. In the exemplary changing of the cholesteric liquid crystal material 33 from the planar state into the focal conic state, the voltage of the data pulse to maximally increase the contrast ratio may be about ±24 V.

The first electrode 12 may be applied with the reset pulse of the high voltage, and then the data pulse of the low voltage may applied such that the cholesteric liquid crystal material 33 of the cholesteric liquid crystal capsule 32 may change, e.g., gradually change, into the focal conic state. As the number of applied data pulses is increased, the amount cholesteric liquid crystal material 33 that is changed into the focal conic state is increased. If a large number of data pulses are applied during the data period, all cholesteric liquid crystal material 33 included in the cholesteric liquid crystal capsule 32 is changed into the focal conic state. If the first electrode 12 is applied with the low voltage of 0V after the data pulse of the predetermined voltage is applied, the cholesteric liquid crystal material 33 that is changed into the focal conic state may be stable with the focal conic state. The cholesteric liquid crystal material 33 that is not changed into the focal conic state may be changed into the planar state by the voltage that is quickly decreased.

That is, the cholesteric liquid crystal material of the focal conic state and the cholesteric liquid crystal material of the planar state may be formed together according to the number of data pulses that are applied to the cholesteric liquid crystal capsule 32, thereby displaying the grayscale. The initial state of the cholesteric liquid crystal capsule 32 may represent the maximum grayscale. The grayscale may be decreased by one step, e.g., whenever one positive voltage data pulse +DP or one negative voltage data pulse −DP is applied. If all the data pulses are applied during the data period, the cholesteric liquid crystal capsule 32 may represent the minimum grayscale.

When the initial state of the cholesteric liquid crystal capsule 32 is the focal conic state, the sustain period to make the cholesteric liquid crystal material 33 into the stable initial state may not be needed. As such, the time for the grayscale display may be shortened. When the initial state of the cholesteric liquid crystal capsule 32 is the planar state, the data pulse may be applied with the voltage of about ±27 V. When the initial state of the cholesteric liquid crystal capsule 32 is the homeotropic state, the data pulse may use the voltage of ±24V and the grayscale may be displayed by using the low voltage of about 3V.

(3) Focal Conic State→the Planar State

Referring to FIG. 12, a sustain period to form the cholesteric liquid crystal material 33 into the stable initial state may be included between the reset period in which the reset pulse RP is applied and the data period in which the data pulse DP is applied.

The short-period AC pulse may be applied as the reset pulse during the reset period. However, embodiments are not limited thereto, e.g., long-period AC pulse or the delay AC pulse may be applied as the reset pulse. The final pulse of the reset period may be the positive voltage reset pulse +RP or the negative voltage reset pulse −RP.

The second electrode 22 may be applied with the common voltage Vcom of about 0 V, and the first electrode 12 may be alternately applied with the positive voltage reset pulse +RP and the negative voltage reset pulse +RP during the reset period. The reset pulse may be applied with the voltage of about ±20 V to about ±30 V. The cholesteric liquid crystal material 33 may be formed with the state in which the spiral structure is not completely loosened by the weak electric field formed between the first electrode 12 and the second electrode 22.

If the low voltage of 0 V is applied to the first electrode 12 at the sustain period to quickly decrease the electric field between the first electrode 12 and the second electrode 22, the cholesteric liquid crystal material 33 may be formed with the focal conic state and may be stable. That is, the cholesteric liquid crystal capsule 32 may form the focal conic state through the reset period and the sustain period.

During the data period, the second electrode 22 may be applied with the common voltage Vcom of about 0 V, and the first electrode 12 may be cumulatively applied with the data pulse of the predetermined level. The data pulse may be the AC pulse ±DP in which the positive voltage data pulse +DP and the negative voltage data pulse −DP may be alternately applied. The voltage of the data pulse to change the cholesteric liquid crystal capsule 32 of the planar state into the planar state may be in the range of about ±30V to about ±40V that is a relatively high voltage compared with the reset pulse.

Whenever the positive voltage data pulse +DP or the negative voltage data pulse −DP is applied, the spiral structure of the partial cholesteric liquid crystal material 33 included in the cholesteric liquid crystal capsule 32 may be loosened, and the homeotropic state in which the cholesteric liquid crystal molecule is oriented toward the direction of the electric field may be formed. As the number of applied data pulses is increased, the cholesteric liquid crystal material 33 that is changed into the homeotropic state in which the spiral structure is loosened may increase. If a large number of data pulses are applied during the data period, all cholesteric liquid crystal material 33 included in the cholesteric liquid crystal capsule 32 may be changed into the homeotropic state. If the low voltage of 0 V is applied to the first electrode 12 after the data pulse of the predetermined voltage is applied, the cholesteric liquid crystal material 33 that is changed into the homeotropic state may be stable with the planar state by the voltage that is quickly decreased, and the cholesteric liquid crystal material 33 that is not changed into the homeotropic state may maintain the focal conic state.

That is, the cholesteric liquid crystal material of the planar state and the cholesteric liquid crystal material of the focal conic state may be formed together, e.g., according to the number of data pulses that are applied to the cholesteric liquid crystal capsule 32, thereby displaying the grayscale according thereto. The initial state of the cholesteric liquid crystal capsule 32 may represent the minimum grayscale, and the grayscale is increased by one step whenever one positive voltage data pulse +DP or one negative voltage data pulse −DP is applied. If all data pulses are applied during the data period, the cholesteric liquid crystal capsule 32 may represent the maximum grayscale.

On the other hand, as types of data pulses, there are (1) a short-period AC pulse including a positive voltage data pulse and a negative voltage data pulse of the predetermined level, (2) a long-period AC pulse including a plurality of sequent short-period positive voltage data pulses and a plurality of sequent short-period negative voltage data pulses, and (3) a delay AC pulse including a delay time in which 0V is applied between the positive voltage data pulse and the negative voltage data pulse, or between the negative voltage data pulse and the positive voltage data pulse.

Referring to FIG. 13, the type of data pulse is the case of the short-period AC pulse. The positive voltage data pulse +DP and the negative voltage data pulse −DP of the predetermined level are alternately applied during the reset period. For example, when the data period is 100 ms, the short-period positive voltage data pulse +RP and the negative voltage data pulse −RP having the pulse width of 10 ms may be alternately applied ten times.

Referring to FIG. 14, the type of data pulse is the case of the long-period AC pulse. A plurality of sequent short-period positive voltage data pulses and a plurality of sequent short-period negative voltage data pulses of the predetermined level are applied during the data period. The long-period positive voltage data pulse +DP includes a plurality of short-period positive voltage data pulses. The long-period negative voltage data pulse −DP includes a plurality of short-period negative voltage data pulses. For example, when the pulse width of the short-period AC pulse is 10 ms and the pulse width of the long-period AC pulse is 50 ms, one long-period AC pulse includes five short-period AC pulses.

Referring to FIG. 15, the type of data pulse is the case of the delay AC pulse. The negative voltage data pulse −DP may be applied after the predetermined delay time after the positive voltage data pulse +DP is applied, and the positive voltage data pulse +DP may be applied after the predetermined delay time after the negative voltage data pulse −DP is applied. The voltage 0 V that is the same as the common voltage Vcom may be applied during the delay time.

If the AC pulse in which the positive voltage data pulse +RP and the negative voltage data pulse −RP are alternately applied is used as the data pulse, deterioration of the cholesteric liquid crystal material 33 may be suppressed.

Figure 16:
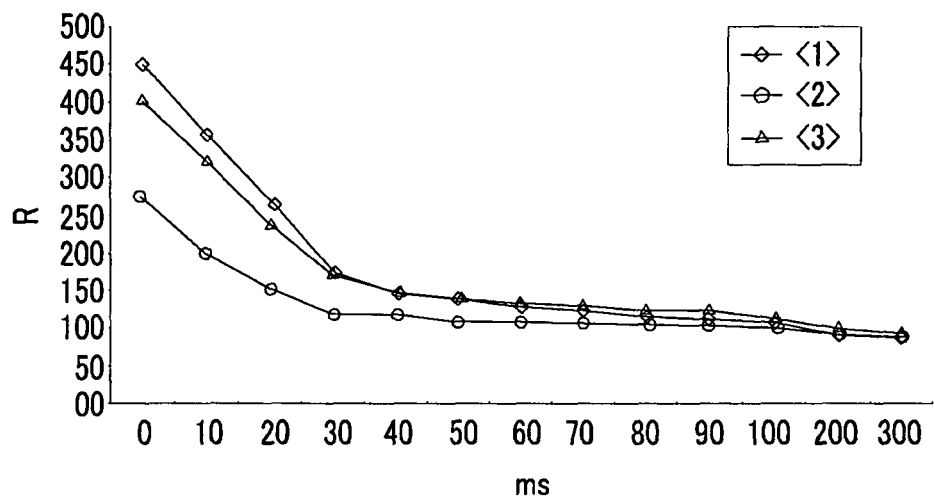
FIG. 16 illustrates a graph of reflexibility according to a type of a reset pulse, according to an exemplary embodiment.

FIG. 16 is a graph showing reflexibility according to a type of a reset pulse, according to an exemplary embodiment.

Referring to FIG. 16, as types of reset pulses forming a planar state as an initial state of the cholesteric liquid crystal capsule 32, there are (1) a case using a short-period AC pulse, (2) a case using a long-period AC pulse, and (3) a case using a delay AC pulse.

When comparing the reflexibility R of the initial state (0 ms) formed by the reset pulse of each type, (1) the reflexibility of the case using the short-period AC pulse may be the highest, and (2) the reflexibility of the case using the long-period AC pulse may be the lowest. Accordingly, (1) the short-period AC pulse may be used as the reset pulse, and the final pulse of the reset period consists of the positive voltage reset pulse such that the contrast rate of the cholesteric liquid crystal capsule 32 may be increased.

Figure 17:
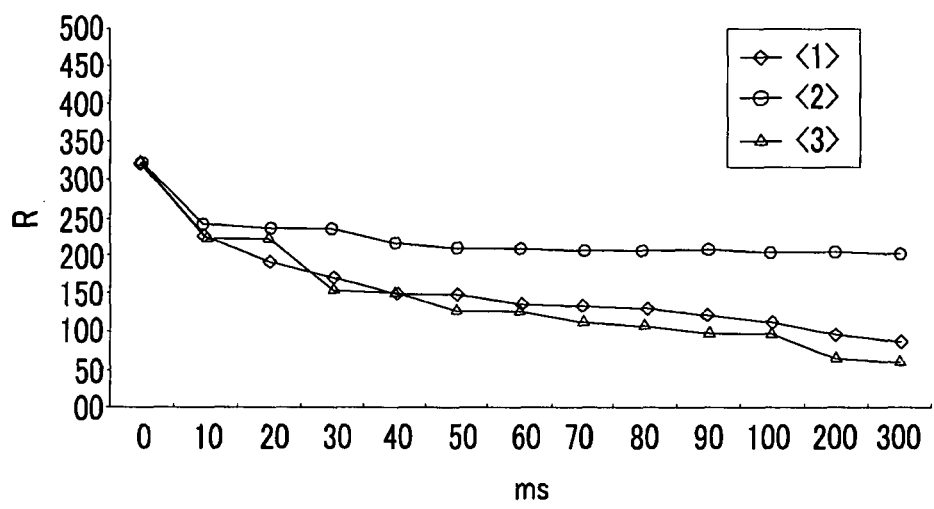
FIG. 17 illustrates a graph of reflexibility according to a type of a data pulse, according to an exemplary embodiment.

FIG. 17 is a graph showing reflexibility according to a type of a data pulse according to an exemplary embodiment.

Referring to FIG. 17, as a type of the data pulse to display the grayscale of the cholesteric liquid crystal capsule 32, there are (1) a case using the short-period AC pulse, (2) a case using the long-period AC pulse, and (3) a case using the delay AC pulse.

Comparing the reflexibility that is changed according to the application of the data pulse of each type with the reflexibility R of the initial state (0 ms) being equal, the reflexibility of the cholesteric liquid crystal capsule 32 is decreased by the data pulse to display the grayscale (the planar state→the focal conic state), the reflexibility of the case of (1) the short-period AC pulse and (3) the delay AC pulse are largely changed, and the reflexibility of the case of (2) the long-period AC pulse is slightly changed. Accordingly, the data pulse uses (1) the short-period AC pulse or (3) the delay AC pulse such that the contrast rate of the cholesteric liquid crystal capsule 32 may be increased.

A display device displaying the grayscale by using the cholesteric liquid crystal capsule 32 has been described above, however the display device may display an RGB image as well as the grayscale by controlling the selection wavelength of the cholesteric liquid crystal material 33 included in the cholesteric liquid crystal capsule 32.

By way of summation and review, a representative product that is closest to a commercially available flexible display may be electronic paper. Electronic paper may be considered a next generation display. The electronic paper may be capable of being portable with a feeling of paper, and may have characteristics that allow for easy display and easy erasure. Electronic paper, as a display element in which a paper printed object and a display medium are mixed, may be capable of being bent or rolled like paper. Electronic paper may have a bistability characteristic in which a realized character or image is maintained as it is, and simultaneously has an electronic device characteristic as a display.

Electronic paper may be read with a limitation of time and place, and should be carefully treated because of the light weight, the thin thickness, and the bending capabilities. Also, electronic paper has bistability such that a realized information image may be maintained without a power source, and the information may be updated through rewriting of a character or image. Electronic paper may have the bistability characteristic that may not be realized by a liquid crystal display (LCD), a plasma display panel (PDP, and an organic light emitting diode (OLED) display. Accordingly, an initial power source for realizing the fixed character and pattern may be needed, and electronic paper may be a low power consumption element in which additional power consumption is not generated before switching to a new screen. Also, electronic paper as a reflective element, without a backlight, may seldom be affected by ink during bending such that the flexibility realization is manifested.

As representative displays having bistability, there are, e.g., a twisted ball (referred to as gyricon ball) display using a charged hemispherical twisted ball, an electrophoretic display applying electrophoresis and microcapsules, and a cholesteric liquid crystal display using a cholesteric liquid crystal.

The cholesteric liquid Crystal display is a reflective display that may control the reflection of light by using, e.g., a stable state of a planar state and a focal conic state. In the cholesteric liquid crystal, a director of the liquid crystal may be twisted according to, e.g., a spiral axis by an external electric field. The distance that the director of the liquid crystal is rotated to 360 degrees is referred to as a pitch. A wavelength range of the light reflected by the cholesteric liquid crystal is determined.

If the external electric field is quickly removed after arranging the cholesteric liquid crystal of a homeotropic state through the application of an appropriate external electric field, the spiral axis of the liquid crystal may change to a planar state having a periodically spiral structure that is perpendicular to a cell surface. Next, if the external electric field is slowly decreased after the cholesteric liquid crystal is arranged in a homeotropic state through the application of the external electric field, the liquid crystal changes to the focal conic state in which the spiral axis is approximately parallel to the cell surface. Incident light having a predetermined wavelength may be reflected in the planar state, and incident light may be transmitted in the focal conic state. In the reflective cholesteric liquid crystal display, the planar state displays a high grayscale and the focal conic state displays a low grayscale. The cholesteric liquid crystal may have a memory characteristic such that the state is maintained as it is if the external electric field is blocked.

The memory characteristic of the cholesteric liquid crystal may be easily deformed by external pressure. If external pressure is applied to the cell surface of the cholesteric liquid crystal, the spiral axis of the liquid crystal may be arranged in the direction of the external pressure such that the arrangement state of the liquid crystal is deformed. The deformed arrangement state may not be restored to the original state by the memory characteristic of the cholesteric liquid crystal, e.g., after the external pressure is applied.

An exemplary driving method of a display device includes cumulatively applying a reset pulse of a predetermined level to a first electrode and applying a common voltage to a second electrode opposed to the first electrode to form a plurality of cholesteric liquid crystal capsules included in a liquid crystal layer between the first electrode and the second electrode as an initial state, and cumulatively applying a data pulse of a predetermined level to the first electrode to display a grayscale. A cholesteric liquid crystal display having strong resistance against external pressure may be provided by encapsulating the cholesteric liquid crystal. To display the grayscale in the cholesteric liquid crystal display, one voltage level may be used without a plurality of voltage levels such that the driving IC may be simplified, and may be down-sized.

The drawings and detailed description described above are examples and are provided to explain the present invention, but the scope of the present invention described in the claims is not limited thereto. Therefore, it will be appreciated to those skilled in the art that various modifications may be made and other equivalent embodiments are available. Accordingly, the actual scope of the present invention must be determined by the spirit of the appended claims.

What is claimed is:

1. A method for driving a display device, comprising:
   cumulatively applying a reset pulse of a predetermined level to a first electrode and applying a common voltage to a second electrode opposed to the first electrode to form an initial state of a plurality of cholesteric liquid crystal capsules included in a liquid crystal layer between the first electrode and the second electrode, the reset pulse being cumulatively applied to the first electrode and the common voltage being applied to the second electrode in a reset period; and
   cumulatively applying a data pulse of a predetermined level to the first electrode in a data period for a predetermined time in order to display light having a grayscale value, wherein:
   the predetermined time allows the plurality of cholesteric liquid crystal capsules to change from the initial state to a second state
   the initial state and the second state are selected from the group consisting of a planar state and a focal conic state, and
   in a sustain period between the reset period and the data period, the plurality of cholesteric liquid crystal capsules reach a stable condition in the initial state during the sustain period when the initial state is the planar state or the focal conic state.

2. The method of claim 1, wherein the reset pulse includes a positive voltage reset pulse and a negative voltage reset pulse.

3. The method of claim 2, wherein the reset pulse is a short-period AC pulse in which the positive voltage reset pulse and the negative voltage reset pulse are alternately applied.

4. The method of claim 2, wherein the reset pulse is a delay AC pulse including a delay time in which 0 V is applied between the positive voltage reset pulse and the negative voltage reset pulse.

5. The method of claim 2, wherein the reset pulse is applied during a reset period, and a final pulse of the reset period is the positive voltage reset pulse.

6. The method of claim 2, wherein the reset pulse is applied during a reset period, and a final pulse of the reset period is the negative voltage reset pulse.

7. The method of claim 2, wherein the reset pulse is a long-period AC pulse including a plurality of sequential positive voltage reset pulses and a plurality of sequential negative voltage reset pulses.

8. The method of claim 1, wherein the data pulse includes a positive voltage data pulse and a negative voltage data pulse.

9. The method of claim 8, wherein the data pulse is a short-period AC pulse in which the positive voltage data pulse and the negative voltage data pulse are alternately applied.

10. The method of claim 8, wherein the data pulse is a delay AC pulse including a delay time in which 0 V is applied between the positive voltage data pulse and the negative voltage data pulse.

11. The method of claim 8, wherein the data pulse is a long-period AC pulse including a plurality of sequential positive voltage data pulses and a plurality of sequential negative voltage data pulses.

12. The method of claim 1, wherein the initial state is a planar state in which spiral axes of cholesteric liquid crystal molecules in the plurality of cholesteric liquid crystal capsules are oriented toward a direction perpendicular to the first electrode and the second electrode.

13. The method of claim 1, wherein the initial state is a homeotropic state in which cholesteric liquid crystal molecules of the plurality of cholesteric liquid crystal capsules are oriented toward a direction of the electric field.

14. The method of claim 1, wherein the initial state is a focal conic state in which spiral axes of cholesteric liquid crystal molecules in the plurality of cholesteric liquid crystal capsules are oriented toward a direction parallel to the first electrode and the second electrode.

15. A display device, comprising:
   a first substrate;
   a first electrode on the first substrate;
   a second substrate opposed to the first substrate;
   a second electrode under the second substrate and opposed to the first electrode;
   a liquid crystal layer positioned between the first electrode and the second electrode, the liquid crystal layer including a plurality of cholesteric liquid crystal capsules; and
   a controller configured to cumulatively apply a reset pulse of a first level and to cumulatively apply a data pulse of a second level to the first electrode for a predetermined time and configured to apply a common voltage to the second electrode, wherein:
   the reset pulse is cumulatively applied in a reset period,
   the data pulse is cumulatively applied in a data period,
   the predetermined time allows the plurality of cholesteric liquid crystal capsules to change from an initial state to a second state,
   the initial state and the second state are selected from the group consisting of a planar state and a focal conic state, and
   in a sustain period between the reset period and the data period, the plurality of cholesteric liquid crystal capsules reach a stable condition in the initial state during the sustain period when the initial state is the planar state or the focal conic state.

16. The display device of claim 15, wherein the first electrode includes a material that absorbs incident light.

17. The display device of claim 16, wherein the first electrode includes one of carbon black, a compound of a carbon black and polyvinylidene fluoride, a compound of a carbon nanotubes and polyvinylidene fluoride, a composite of a black dye and nano-silver, and a graphite composite.

18. The display device of claim 15, wherein the second electrode includes one of indium tin oxide and indium zinc oxide.

19. The display device of claim 15, wherein each of the plurality of cholesteric liquid crystal capsules include a cholesteric liquid crystal material including a chiral agent configured to provide a twisting force to a liquid crystal molecule added to a nematic liquid crystal material having a positive dielectric constant anisotropy, and a polymer encapsulating the cholesteric liquid crystal material.

20. The display device of claim 15, wherein the controller is configured to cumulatively apply the reset pulse of the first level during a predetermined reset period such that the cholesteric liquid crystal capsules have an initial state of a planar state, a homeotropic state, or a focal conic state.

21. The display device of claim 20, wherein the reset pulse of the first level includes a positive voltage reset pulse and a negative voltage reset pulse.

22. The display device of claim 21, wherein the controller is configured to alternately apply the positive voltage reset pulse and the negative voltage reset pulse.

23. The display device of claim 21, wherein the controller is configured to apply the positive voltage reset pulse and the negative voltage reset pulse with a delay time in which 0 V is applied between the positive voltage reset pulse and the negative voltage reset pulse.

24. The display device of claim 21, wherein the controller is configured to apply a plurality of sequential positive voltage reset pulses and a plurality of sequential negative voltage reset pulses.

25. The display device of claim 20, wherein the controller is configured to cumulatively apply the data pulse of the second level during a predetermined data period such that a cholesteric phase of cholesteric liquid crystal material included in the cholesteric liquid crystal capsules are changed from the initial state for displaying a grayscale.

26. The display device of claim 25, wherein the data pulse of the second level includes a positive voltage data pulse and a negative voltage data pulse.

27. The display device of claim 26, wherein the controller is configured to alternately apply the positive voltage data pulse and the negative voltage data pulse.

28. The display device of claim 26, wherein the controller is configured to apply the positive voltage data pulse and the negative voltage data pulse with a delay time in which 0 V is applied between the positive voltage data pulse and the negative voltage data pulse.

29. The display device of claim 26, wherein the controller is configured to apply a plurality of sequential positive voltage data pulses and a plurality of sequential negative voltage data pulses.

* * * * *